(12) United States Patent
Quigley et al.

(10) Patent No.: US 10,378,463 B2
(45) Date of Patent: Aug. 13, 2019

(54) SELECTIVE CATALYTIC REDUCTION STEADY STATE AMMONIA SLIP DETECTION

(71) Applicant: GM Global Technology Operations LLC, Detroit, MI (US)

(72) Inventors: David P. Quigley, Brighton, MI (US); Sarah Funk, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 67 days.

(21) Appl. No.: 15/645,424

(22) Filed: Jul. 10, 2017

(65) Prior Publication Data

US 2019/0010884 A1    Jan. 10, 2019

(51) Int. Cl.

| F01N 3/10 | (2006.01) |
|---|---|
| F01N 3/20 | (2006.01) |
| F01N 11/00 | (2006.01) |
| F01N 3/035 | (2006.01) |
| F02D 41/02 | (2006.01) |

(Continued)

(52) U.S. Cl.
CPC ......... *F02D 41/0235* (2013.01); *F01N 3/208* (2013.01); *F01N 11/00* (2013.01); *F02D 41/1441* (2013.01); *F02D 41/1463* (2013.01); *F02D 41/1465* (2013.01); *F02D 41/26* (2013.01); *F01N 3/035* (2013.01); *F01N 3/103* (2013.01); *F01N 2560/026* (2013.01); *F01N 2560/06* (2013.01); *F01N 2560/14* (2013.01); *F01N 2570/14* (2013.01); *F01N 2570/18* (2013.01); *F01N 2610/02* (2013.01); *F01N 2900/0422* (2013.01); *F01N 2900/08* (2013.01); *F01N 2900/1616* (2013.01); *F01N 2900/1812* (2013.01); *F01N 2900/1821* (2013.01); *F02D 2041/1469* (2013.01); *F02D 2250/36* (2013.01)

(58) Field of Classification Search
USPC .......... 60/274, 276, 286, 295, 297, 301, 303
See application file for complete search history.

(56) References Cited

U.S. PATENT DOCUMENTS

| 7,178,328 B2 * | 2/2007 | Solbrig ................. B01D 53/90 60/286 |
| 2009/0185954 A1 * | 7/2009 | Qi .......................... F01N 3/208 422/62 |

(Continued)

*Primary Examiner* — Binh Q Tran
(74) *Attorney, Agent, or Firm* — Cantor Colburn LLP (57) ABSTRACT

Technical solutions are described for an emissions control system for a motor vehicle including an internal combustion engine. The emissions control system includes a selective catalytic reduction (SCR) device, an NOx sensor, and a controller for ammonia slip detection. The ammonia slip detection includes comparing an NOx measurement from the NOx sensor with a predicted NOx value. In response to the NOx measurement exceeding the predicted NOx value by a threshold value, the threshold value being calibrated to a first predetermined value, the threshold value is calibrated to a second predetermined value, a timer is initiated to a predetermined duration, and during the predetermined duration of the timer, in response to a second NOx measurement from the NOx sensor exceeding the predicted NOx value by the threshold value set to the second predetermined value, a reductant dosing rate of the SCR device is adapted according to the second predetermined value.

20 Claims, 5 Drawing Sheets

(51) Int. Cl.
*F02D 41/14* (2006.01)
*F02D 41/26* (2006.01)

(56) References Cited

U.S. PATENT DOCUMENTS

| | | | | |
|---|---|---|---|---|
| 2011/0311420 | A1* | 12/2011 | Perrin | F01N 3/208 423/213.2 |
| 2015/0075143 | A1* | 3/2015 | Gong | F01N 3/208 60/301 |
| 2015/0247435 | A1* | 9/2015 | Garimella | F01N 3/208 60/274 |
| 2016/0024988 | A1* | 1/2016 | Whitt | F01N 11/00 423/212 |
| 2016/0108791 | A1* | 4/2016 | Charbonnel | G01M 15/102 436/37 |

* cited by examiner

SELECTIVE CATALYTIC REDUCTION STEADY STATE AMMONIA SLIP DETECTION

INTRODUCTION

The present disclosure relates to exhaust systems for internal combustion engines, and more particularly to exhaust systems using selective catalytic reduction (SCR) units for emission control.

Exhaust gas emitted from an internal combustion engine, particularly a diesel engine, is a heterogeneous mixture that contains gaseous emissions such as carbon monoxide ("CO"), unburned hydrocarbons ("HC") and oxides of nitrogen ("$NO_x$") as well as condensed phase materials (liquids and solids) that constitute particulate matter ("PM"). Catalyst compositions, typically disposed on catalyst supports or substrates, are provided in an engine exhaust system as part of an aftertreatment system to convert certain, or all of these exhaust constituents into non-regulated exhaust gas components.

Exhaust gas treatment systems typically include selective catalytic reduction (SCR) devices. An SCR device includes a substrate having an SCR catalyst disposed thereon to reduce the amount of NOx in the exhaust gas. The typical exhaust treatment system also includes a reductant delivery system that injects a reductant such as, for example, ammonia (NH3), urea (CO(NH2)2, etc.). The SCR device makes use of NH3 to reduce the NOx. For example, when the proper amount of NH3 is supplied to the SCR device under the proper conditions, the NH3 reacts with the NOx in the presence of the SCR catalyst to reduce the NOx emissions. If the reduction reaction rate is too slow, or if there is excess ammonia in the exhaust, ammonia can slip from the SCR. On the other hand, if there is too little ammonia in the exhaust, SCR NOx conversion efficiency will be decreased.

SUMMARY

One or more embodiments describe an emissions control system for a motor vehicle including an internal combustion engine. The emissions control system includes a selective catalytic reduction (SCR) device, an NOx sensor, and a controller for ammonia slip detection. The ammonia slip detection includes comparing an NOx measurement from the NOx sensor with a predicted NOx value. In response to the NOx measurement exceeding the predicted NOx value by a threshold value, the threshold value being calibrated to a first predetermined value, the threshold value is calibrated to a second predetermined value, a timer is initiated to a predetermined duration, and during the predetermined duration of the timer, in response to a second NOx measurement from the NOx sensor exceeding the predicted NOx value by the threshold value set to the second predetermined value, a reductant dosing rate of the SCR device is adapted according to the second predetermined value.

In one or more examples, the controller, after adapting the reductant dosing rate of the SCR device according to the second predetermined value, calibrates the threshold value to the first predetermined value.

Further, in one or more examples, the predicted NOx value is based on a chemical model of the SCR device.

In one or more examples, the NOx sensor is located downstream from the SCR device.

In one or more examples, the second predetermined value is smaller than the first predetermined value.

Further, in one or more examples, the controller further determines that an operating state of the internal combustion engine, and initializes the ammonia slip detection in response to the internal combustion engine operating in a steady state.

According to one or more embodiments, an exhaust system for treating exhaust gas emitted by an internal combustion engine is described. The exhaust system performs a selective catalytic reduction (SCR) of exhaust gas. The exhaust system includes a controller for performing ammonia slip detection. The performing ammonia slip detection includes comparing an NOx measurement from an NOx sensor of the exhaust system with a predicted NOx value. Further, in response to the NOx measurement exceeding the predicted NOx value by a threshold value, the threshold value is calibrated to a first predetermined value. Further yet, the threshold value is calibrated to a second predetermined value, and a timer of a predetermined duration is initiated. During the predetermined duration of the timer, in response to a second NOx measurement from the NOx sensor exceeding the predicted NOx value by the threshold value set to the second predetermined value, adapting a reductant dosing rate for the SCR according to the second predetermined value.

In one or more examples, after completion of the timer, the threshold value is calibrated to the first predetermined value. Further, in one or more examples, after adapting the reductant dosing rate of the SCR according to the second predetermined value, the threshold value is calibrated to the first predetermined value.

In one or more examples, the predicted NOx value is based on a chemical model of the SCR. Further, the NOx sensor measures the NOx measurement downstream after the SCR of the exhaust gas.

In one or more examples, the second predetermined value is smaller than the first predetermined value.

In one or more examples, the controller determines that an operating state of the internal combustion engine, and initializes the ammonia slip detection in response to the internal combustion engine operating in a steady state.

Further yet, one or more embodiments are described for a computer-implemented method for controlling a selective catalytic reduction (SCR) device of an exhaust system of an internal combustion engine. The method includes performing ammonia slip detection by comparing an NOx measurement from an NOx sensor of the SCR device with a predicted NOx value. Further, in response to the NOx measurement exceeding the predicted NOx value by a threshold value, the threshold value being calibrated to a first predetermined value, the method includes calibrating the threshold value to a second predetermined value; and initiating a timer of a predetermined duration. During the predetermined duration of the timer, in response to a second NOx measurement from the NOx sensor exceeding the predicted NOx value by the threshold value set to the second predetermined value, adapting a reductant dosing rate of the SCR device according to the second predetermined value.

In one or more examples, after completion of the timer, the threshold value is calibrated to the first predetermined value. Further, after adapting the reductant dosing rate of the SCR device according to the second predetermined value, the threshold value is calibrated to the first predetermined value.

In one or more examples, the second predetermined value is smaller than the first predetermined value. In one or more examples, the method further includes determining that an operating state of the internal combustion engine; and initializing the ammonia slip detection in response to the internal combustion engine operating in a steady state.

In one or more examples, the NOx sensor is located downstream from the SCR device.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory module that executes one or more software or firmware programs, a combinational logic circuit, and/or other suitable components that provide the described functionality.

Figure 1:
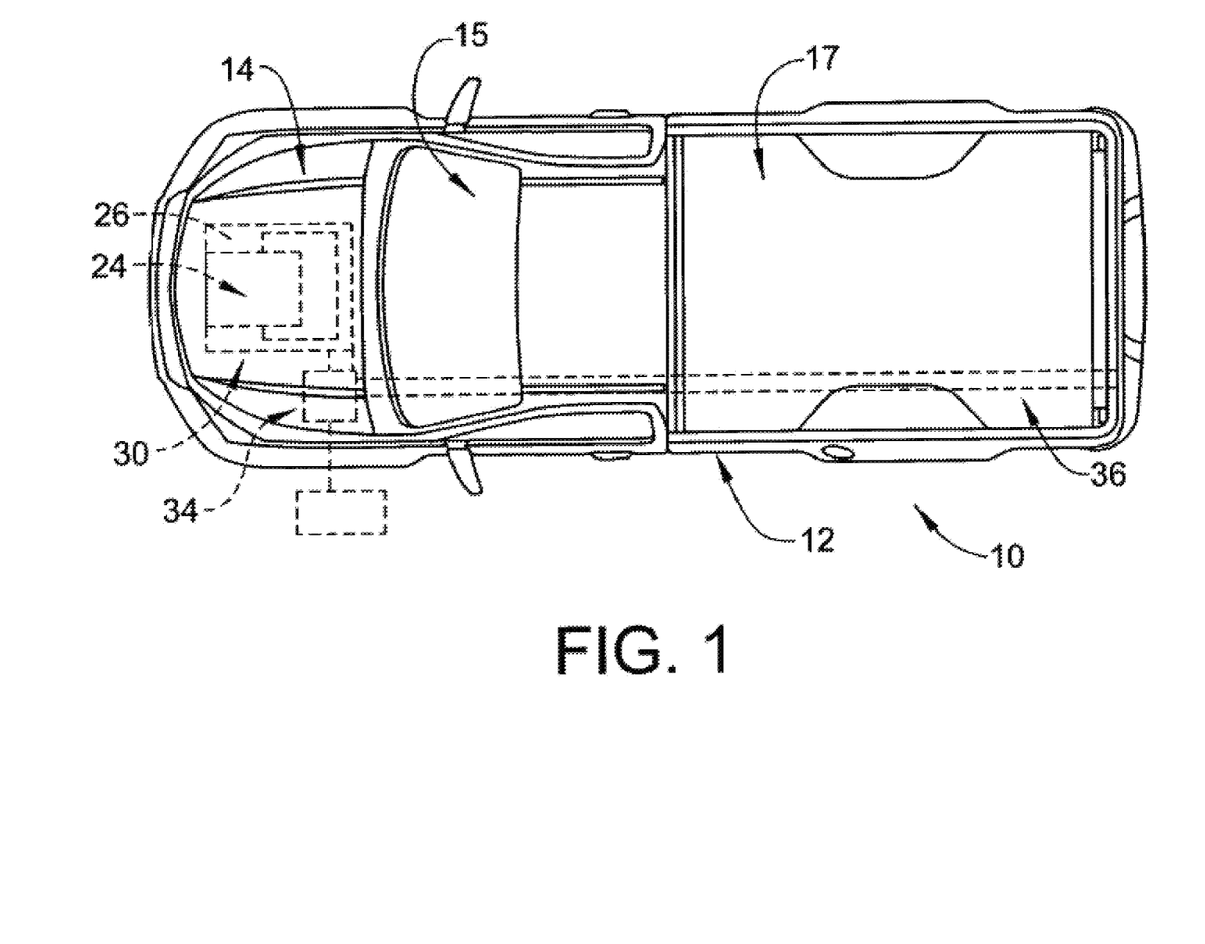
FIG. 1 depicts a motor vehicle including an internal combustion engine and an emission control system according to one or more embodiments.

A motor vehicle, in accordance with an aspect of an exemplary embodiment, is indicated generally at 10 in FIG. 1. Motor vehicle 10 is shown in the form of a pickup truck. It is to be understood that motor vehicle 10 may take on various forms including automobiles, commercial transports, marine vehicles, and the like. Motor vehicle 10 includes a body 12 having an engine compartment 14, a passenger compartment 15, and a cargo bed 17. Engine compartment 14 houses an internal combustion engine system 24, which, in the exemplary embodiment shown, may include a diesel engine 26. Internal combustion engine system 24 includes an exhaust system 30 that is fluidically connected to an aftertreatment or emissions control system 34. Exhaust produced by internal combustion engine (ICE) system 24 passes through emissions control system 34 to reduce emissions that may exit to ambient through an exhaust outlet pipe 36.

It should be noted that technical solutions described herein are germane to ICE systems that can include, but are not limited to, diesel engine systems and gasoline engine systems. The ICE system 24 can include a plurality of reciprocating pistons attached to a crankshaft, which may be operably attached to a driveline, such as a vehicle driveline, to power a vehicle (e.g., deliver tractive torque to the driveline). For example, the ICE system 24 can be any engine configuration or application, including various vehicular applications (e.g., automotive, marine and the like), as well as various non-vehicular applications (e.g., pumps, generators and the like). While the ICEs may be described in a vehicular context (e.g., generating torque), other non-vehicular applications are within the scope of this disclosure. Therefore, when reference is made to a vehicle, such disclosure should be interpreted as applicable to any application of an ICE system.

Moreover, an ICE can generally represent any device capable of generating an exhaust gas stream comprising gaseous (e.g., $NO_x$, $O_2$), carbonaceous, and/or particulate matter species, and the disclosure herein should accordingly be interpreted as applicable to all such devices. As used herein, "exhaust gas" refers to any chemical species or mixture of chemical species which may require treatment, and includes gaseous, liquid, and solid species. For example, an exhaust gas stream may contain a mixture of one or more $NO_x$ species, one or more liquid hydrocarbon species, and one more solid particulate species (e.g., ash). It should be further understood that the embodiments disclosed herein may be applicable to treatment of effluent streams not comprising carbonaceous and/or particulate matter species, and, in such instances, ICE 26 can also generally represent any device capable of generating an effluent stream comprising such species. Exhaust gas particulate matter generally includes carbonaceous soot, and other solid and/or liquid carbon-containing species which are germane to ICE exhaust gas or form within an emissions control system 34.

Figure 2:
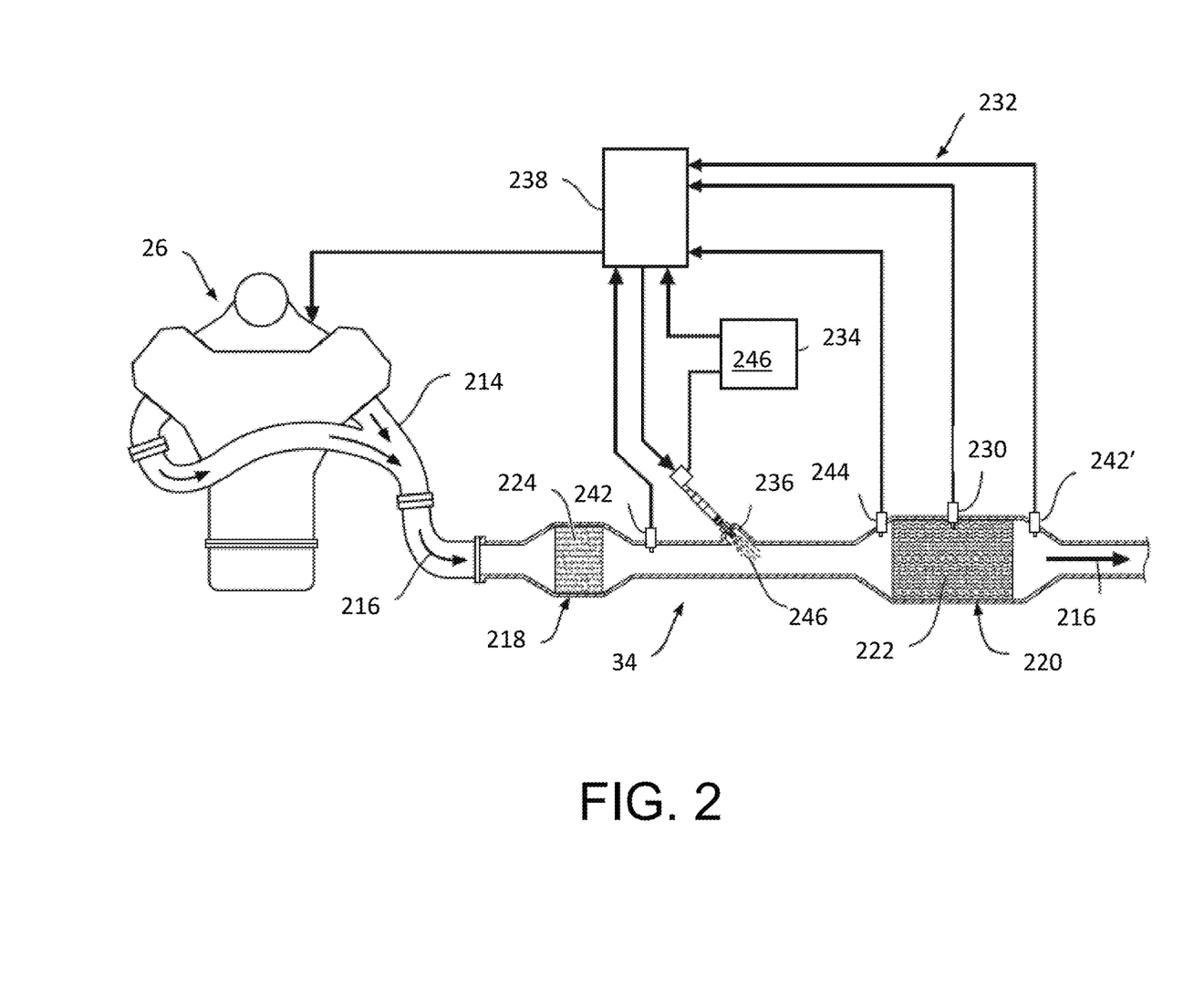
FIG. 2 illustrates example components of an emissions control system according to one or more embodiments.

FIG. 2 illustrates example components of the emissions control system 34 according to one or more embodiments. It should be noted that while the internal combustions engine system 24 includes a diesel engine 26 in the above example, the emissions control system 34 described herein can be implemented in various engine systems. The emissions control system 34 facilitates the control and monitoring of $NO_x$ storage and/or treatment materials, to control exhaust produced by the internal combustion engine system 24. For example, the technical solutions herein provide methods for controlling selective catalytic reduction (SCR) devices, and appurtenant $NO_x$ sensors, wherein the SCR devices are configured to receive exhaust gas streams from an exhaust gas source. As used herein, "$NO_x$" refers to one or more nitrogen oxides. $NO_x$ species can include $N_yO_x$ species, wherein y>0 and x>0. Non-limiting examples of nitrogen oxides can include NO, $NO_2$, $N_2O$, $N_2O_2$, $N_2O_3$, $N_2O_4$, and $N_2O_5$. SCR devices are configured to receive reductant, such as at variable dosing rates as will be described below.

The exhaust gas conduit 214, which may comprise several segments, transports exhaust gas 216 from the engine 26 to the various exhaust treatment devices of the emissions control system 34. For example, as illustrated, the emission control system 34 includes a SCR device 220. In one or more examples, the SCR device 220 can include a selective catalytic filter (SCRF) device, which provides the catalytic aspects of an SCR in addition to particulate filtering capabilities. Alternatively, or in addition, the SCR catalyst can also be coated on a flow through substrate. As can be appreciated, system 34 can include various additional treatment devices, including an oxidation catalyst (OC) device 218, and particulate filter devices (not shown), among others.

As can be appreciated, the OC device 218 can be one of various flow-through, oxidation catalyst devices known in the art. In various embodiments the OC device 218 may include a flow-through metal or ceramic monolith substrate 224. The substrate 224 may be packaged in a stainless steel shell or canister having an inlet and an outlet in fluid communication with the exhaust gas conduit 214. The substrate 224 may include an oxidation catalyst compound disposed thereon. The oxidation catalyst compound may be applied as a washcoat and may contain platinum group metals such as platinum (Pt), palladium (Pd), rhodium (Rh) or other suitable oxidizing catalysts, or combination thereof. The OC device 218 is useful in treating unburned gaseous and non-volatile HC and CO, which are oxidized to form carbon dioxide and water. A washcoat layer includes a compositionally distinct layer of material disposed on the surface of the monolithic substrate or an underlying washcoat layer. A catalyst can contain one or more washcoat layers, and each washcoat layer can have unique chemical catalytic functions. In the SCR device 220, the catalyst compositions for the SCR function and $NH_3$ oxidation function can reside in discrete washcoat layers on the substrate or, alternatively, the compositions for the SCR and $NH_3$ oxidation functions can reside in discrete longitudinal zones on the substrate.

The SCR device 220 may be disposed downstream from the OC device 218. In one or more examples, the SCR device 220 includes a filter portion 222 that can be a wall flow filter that is configured to filter or trap carbon and other particulate matter from the exhaust gas 216. In at least one exemplary embodiment, the filter portion 222 is formed as a particulate filter (PF), such as a diesel particulate filter (DPF). The filter portion (i.e., the PF) may be constructed, for example, using a ceramic wall flow monolith exhaust gas filter substrate, which is packaged in a rigid, heat resistant shell or canister. The filter portion 222 has an inlet and an outlet in fluid communication with exhaust gas conduit 214 and may trap particulate matter as the exhaust gas 216 flows therethrough. It is appreciated that a ceramic wall flow monolith filter substrate is merely exemplary in nature and that the filter portion 222 may include other filter devices such as wound or packed fiber filters, open cell foams, sintered metal fibers, etc. The emissions control system 34 may also perform a regeneration process that regenerates the filter portion 222 by burning off the particulate matter trapped in the filter substrate, in one or more examples.

In one or more examples, the SCR device 220 receives reductant, such as at variable dosing rates. Reductant 246 can be supplied from a reductant supply source 234. In one or more examples, the reductant 246 is injected into the exhaust gas conduit 214 at a location upstream of the SCR device 220 using an injector 236, or other suitable method of delivery. The reductant 246 can be in the form of a gas, a liquid, or an aqueous solution, such as an aqueous urea solution. In one or more examples, the reductant 246 can be mixed with air in the injector 236 to aid in the dispersion of the injected spray. The catalyst containing washcoat disposed on the filter portion 222 or a flow through catalyst or a wall flow filter may reduce NOx constituents in the exhaust gas 216. The SCR device 220 utilizes the reductant 246, such as ammonia ($NH_3$), to reduce the NOx. The catalyst containing washcoat may contain a zeolite and one or more base metal components such as iron (Fe), cobalt (Co), copper (Cu), or vanadium (V), which can operate efficiently to convert NOx constituents of the exhaust gas 216 in the presence of $NH_3$. In one or more examples, a turbulator (i.e., mixer) (not shown) can also be disposed within the exhaust conduit 214 in close proximity to the injector 236 and/or the SCR device 220 to further assist in thorough mixing of reductant 246 with the exhaust gas 216 and/or even distribution throughout the SCR device 220.

The emissions control system 34 further includes a reductant delivery system 232 that introduces the reductant 246 to the exhaust gas 216. The reductant delivery system 232 includes the reductant supply 234 and the injector 236. The reductant supply 234 stores the reductant 246 and is in fluid communication with the injector 236. The reductant 246 may include, but is not limited to, $NH_3$. Accordingly, the injector 236 may inject a selectable amount of reductant 246 into the exhaust gas conduit 214 such that the reductant 246 is introduced to the exhaust gas 216 at a location upstream of the SCR device 220.

In one or more examples, the emissions control system 34 further includes a control module 238 operably connected, via a number of sensors, to monitor the engine 26 and/or the exhaust gas treatment system 34. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality. For example, module 238 can execute a SCR chemical model, as described below. The control module 238 can be operably connected to ICE system 24, SCR device 220, and/or one or more sensors. As shown, the sensors can include an upstream $NO_x$ sensor 242 and downstream $NO_x$ sensor 242', disposed downstream of SCR device 220, each of which are in fluid communication with exhaust gas conduit 214. In one or more examples, the upstream $NO_x$ sensor 242 is disposed downstream of the ICE 26 and upstream of both SCR device 220 and the injector 236. The upstream $NO_x$ sensor 242 and the downstream NOx sensor 242' detect a $NO_x$ level proximate their location within exhaust gas conduit 214, and generate a NOx signal, which corresponds to the NOx level. A NOx level can comprise a concentration, a mass flow rate, or a volumetric flow rate, in some embodiments. A NOx signal generated by a NOx sensor can be interpreted by control module 238, for example. Control module 238 can optionally be in communication one or more temperature sensors, such as upstream temperature sensor 244, disposed upstream from SCR device 220.

The sensors of the emissions control system 34 may further include at least one pressure sensor 230 (e.g., a delta pressure sensor). The delta pressure sensor 230 may determine the pressure differential (i.e., $\Delta p$) across the SCR device 220. Although a single delta pressure sensor 230 is illustrated, it is appreciated that a plurality of pressure sensors may be used to determine the pressure differential of the SCR device 220. For example, a first pressure sensor may be disposed at the inlet of the SCR device 220 and a second pressure sensor may be disposed at the outlet of the SCR device 220. Accordingly, the difference between the pressure detected by the second delta pressure sensor and the pressure detected by the first delta pressure sensor may indicate the pressure differential across the SCR device 220. It should be noted that in other examples, the sensors can include different, additional, or fewer sensors than those illustrated/described herein.

In one or more examples, the SCR device 220 includes one or more components that utilize the reductant 246 and a catalyst to transform NO and $NO_2$ from the exhaust gases 216. The SCR device 220 can include, for example, a flow-through ceramic or metal monolith substrate that can be packaged in a shell or canister having an inlet and an outlet in fluid communication with the exhaust gas conduit 214 and optionally other exhaust treatment devices. The shell or canister can ideally comprise a substantially inert material, relative to the exhaust gas constituents, such as stainless steel. The substrate can include a SCR catalyst composition applied thereto.

The substrate body can, for example, be a ceramic brick, a plate structure, or any other suitable structure such as a monolithic honeycomb structure that includes several hundred to several thousand parallel flow-through cells per square inch, although other configurations are suitable. Each of the flow-through cells can be defined by a wall surface on which the SCR catalyst composition can be washcoated. The substrate body can be formed from a material capable of withstanding the temperatures and chemical environment associated with the exhaust gas 216. Some specific examples of materials that can be used include ceramics such as extruded cordierite, α-alumina, silicon carbide, silicon nitride, zirconia, mullite, spodumene, alumina-silica-magnesia, zirconium silicate, sillimanite, petalite, or a heat and corrosion resistant metal such as titanium or stainless steel. The substrate can comprise a non-sulfating $TiO_2$ material, for example. The substrate body can be a PF device, as will be discussed below.

The SCR catalyst composition is generally a porous and high surface area material which can operate efficiently to convert $NO_x$ constituents in the exhaust gas 216 in the presence of a reductant 246, such as ammonia. For example, the catalyst composition can contain a zeolite impregnated with one or more base metal components such as iron (Fe), cobalt (Co), copper (Cu), vanadium (V), sodium (Na), barium (Ba), titanium (Ti), tungsten (W), and combinations thereof. In a particular embodiment, the catalyst composition can contain a zeolite impregnated with one or more of copper, iron, or vanadium. In some embodiments the zeolite can be a β-type zeolite, a Y-type zeolite, a ZM5 zeolite, or any other crystalline zeolite structure such as a Chabazite or a USY (ultra-stable Y-type) zeolite. In a particular embodiment, the zeolite comprises Chabazite. In a particular embodiment, the zeolite comprises SSZ. Suitable SCR catalyst compositions can have high thermal structural stability, particularly when used in tandem with particulate filter (PF) devices or when incorporated into SCRF devices, which are regenerated via high temperature exhaust soot burning techniques.

The SCR catalyst composition can optionally further comprise one or more base metal oxides as promoters to further decrease the $SO_3$ formation and to extend catalyst life. The one or more base metal oxides can include $WO_3$, $Al_2O_3$, and $MoO_3$, in some embodiments. In one embodiment, $WO_3$, $Al_2O_3$, and $MoO_3$ can be used in combination with $V_2O_5$.

The SCR catalyst generally uses the reductant 246 to reduce $NO_x$ species (e.g., NO and $NO_2$) to harmless components. Harmless components include one or more of species which are not $NO_x$ species, such as diatomic nitrogen, nitrogen-containing inert species, or species which are considered acceptable emissions, for example. The reductant 246 can be ammonia ($NH_3$), such as anhydrous ammonia or aqueous ammonia, or generated from a nitrogen and hydrogen rich substance such as urea ($CO(NH_2)_2$). Additionally or alternatively, the reductant 246 can be any compound capable of decomposing or reacting in the presence of exhaust gas 216 and/or heat to form ammonia. Equations (1)-(5) provide exemplary chemical reactions for $NO_x$ reduction involving ammonia.

$$6NO+4NH_3 \rightarrow 5N_2+6H_2O \quad (1)$$

$$4NO+4NH_3+O_2 \rightarrow 4N_2+6H_2O \quad (2)$$

$$6NO_2+8NH_3 \rightarrow 7N_2+12H_2O \quad (3)$$

$$2NO_2+4NH_3+O_2 \rightarrow 3N_2+6H_2O \quad (4)$$

$$NO+NO_2+2NH_3 \rightarrow 2N_2+3H_2O \quad (5)$$

It should be appreciated that Equations (1)-(5) are merely illustrative, and are not meant to confine the SCR device 220 to a particular NOx reduction mechanism or mechanisms, nor preclude the operation of other mechanisms. The SCR device 220 can be configured to perform any one of the above NOx reduction reactions, combinations of the above NOx reduction reactions, and other NOx reduction reactions.

The reductant 246 can be diluted with water in various implementations. In implementations where the reductant 246 is diluted with water, heat (e.g., from the exhaust) evaporates the water, and ammonia is supplied to the SCR device 220. Non-ammonia reductants can be used as a full or partial alternative to ammonia as desired. In implementations where the reductant 246 includes urea, the urea reacts with the exhaust to produce ammonia, and ammonia is supplied to the SCR device 220. Reaction (6) below provides an exemplary chemical reaction of ammonia production via urea decomposition.

$$CO(NH_2)_2+H_2O \rightarrow 2NH_3+CO_2 \quad (6)$$

It should be appreciated that Equation (6) is merely illustrative, and is not meant to confine the urea or other reductant 246 decomposition to a particular single mechanism, nor preclude the operation of other mechanisms.

The SCR catalyst can store (i.e., absorb, and/or adsorb) reductant for interaction with exhaust gas 216. For example, the reductant 246 can be stored within the SCR device 220 or catalyst as ammonia. A given SCR device 220 has a reductant capacity, or an amount of reductant or reductant derivative it is capable of storing. The amount of reductant stored within an SCR device 220 relative to the SCR catalyst capacity can be referred to as the SCR "reductant loading", and can be indicated as a % loading (e.g., 90% reductant loading) in some instances. During operation of SCR device 220, injected reductant 246 is stored in the SCR catalyst and consumed during reduction reactions with NOx species and must be continually replenished. Determining the precise amount of reductant 246 to inject is critical to maintaining exhaust gas emissions at acceptable levels: insufficient reductant levels within the system 34 (e.g., within SCR device 220) can result in undesirable NOx species emissions ("NOx breakthrough") from the system (e.g., via a vehicle tailpipe), while excessive reductant 246 injection can result in undesirable amounts of reductant 246 passing through the SCR device 220 unreacted or exiting the SCR device 220 as an undesired reaction product ("reductant slip"). Reductant slip and NOx breakthrough can also occur when the SCR catalyst is below a "light-off" temperature, for example if the SCR device 220 is saturated with NH3 (i.e. no more storage sites). SCR dosing logic can be utilized to command reductant 246 dosing, and adaptations thereof, and can be implemented by module 238, for example.

A reductant injection dosing rate (e.g., grams per second) can be determined by a SCR chemical model which predicts the amount of reductant 246 stored in the SCR device 220 based on signals from one or more of reductant 246 injection (e.g., feedback from injector 236) and upstream NOx (e.g., NOx signal from upstream NOx sensor 242). The SCR chemical model further predicts NOx levels of exhaust gas 216 discharged from the SCR device 220. The SCR chemical model can be implemented by control module 238. The SCR chemical model can be updatable by one or more process values over time, for example. A dosing governor (not shown), such as one controlled by module 238, monitors the reductant storage level predicted by the SCR chemical model, and compares the same to a desired reductant storage level. Deviations between the predicted reductant storage level and the desired reductant storage level can be continuously monitored and a dosing adaptation can be triggered to increase or decrease reductant dosing in order to eliminate or reduce the deviation. For example, the reductant dosing rate can be adapted to achieve a desired $NO_x$ concentration or flow rate in exhaust gas 216 downstream of the SCR device 220, or achieve a desired $NO_x$ conversion rate. A desired conversion rate can be determined by many factors, such as the characteristics of SCR catalyst type and/or operating conditions of the system (e.g., ICE 26 operating parameters).

Over time, inaccuracies of the SCR chemical model can compound to appreciative errors between modeled SCR reductant storage level and actual storage level. Accordingly, the SCR chemical model can be continuously corrected to minimize or eliminate errors. One method for correcting an SCR chemical model includes comparing the modeled SCR discharge exhaust gas NOx levels to the actual NOx levels (e.g., as measured by downstream NOx sensor 242') to determine a discrepancy, and subsequently correcting the model to eliminate or reduce the discrepancy. Because NOx sensors (e.g., downstream NOx sensor 242') are cross-sensitive to reductant (e.g., $NH_3$) and NOx, it is critical to distinguish between reductant signals and NOx signals as reductant slip can be confused with insufficient NOx conversion.

In one or more examples, a passive analysis technique used to distinguish between reductant signals and NOx signals is a correlation method which includes comparing the upstream NOx concentration (e.g., such as measured by upstream NOx sensor 242) movement with the downstream NOx concentration (e.g., such as measured by downstream NOx sensor 242'), wherein diverging concentration directions can indicate an increase or decrease in reductant slip. The correlation analysis identifies when the measurements from the downstream NOx sensor 242' are following the pattern of measurements from (i.e. moving like) the upstream NOx sensor 242. The correlation is a statistical measure of the strength and direction of a linear relationship between the two NOx sensors.

For example, the comparison includes a correlation method which includes comparing the downstream NOx concentration with the upstream NOx measurements, or the predicted NOx measurements, wherein diverging concentration directions can indicate an increase or decrease in reductant slip. For example, if the upstream NOx concentration decreases and downstream NOx concentration increases, reductant slip can be identified as increasing. Similarly, if the upstream NOx concentration increases and downstream NOx concentration decreases, reductant slip can be identified as decreasing. Thus, the divergence between the two sequences of NOx measurements can be used to determine a dosing status of the SCR device 220.

Alternatively, or in addition, the comparison includes a frequency analysis. NOx signals generated by NOx sensors can include multiple frequency components (e.g., high frequency and low frequency) due to the variation of the NOx and reductant concentrations during the modulation/demodulation. High frequency signals generally relate only to NOx concentration, while low frequency signals generally relate to both NOx concentration and reductant concentration. High frequency signals for upstream NOx and downstream NOx are isolated and used to calculate a SCR NOx conversion ratio, which is then applied to the isolated low pass upstream NOx signal to determine a low frequency downstream NOx signal. The calculated low frequency downstream NOx signal is then compared to the actual isolated low frequency downstream NOx signal, wherein a deviation between the two values can indicate reductant slip.

A drawback of passive analysis techniques such as the correlation method and frequency method described above is that they rely on the proper operation of two NOx sensors. For example, a faulty upstream NOx sensor (e.g., upstream NOx sensor 242) can generate a NOx signal which is lower than the actual NOx level proximate the upstream NOx sensor causing the SCR chemical model to predict higher reductant storage than the actual storage. Accordingly, NOx breakthrough would be incorrectly identified as reductant slip, and reductant dosing would be commanded such that NOx breakthrough would be exacerbated (i.e., reductant dosing would be decreased). Further, the SCR chemical model would be updated using the inaccurate upstream NOx measurement, and the exacerbated NOx breakthrough would endure. Additionally or alternatively, in a similar manner an $NH_3$ slip can be incorrectly interpreted as NOx breakthrough.

Another drawback of the correlation and frequency passive analysis techniques is that they cannot be implemented while the SCR is in steady state. "Steady state" is determined, for example, by taking the root mean square value of a NOx signal upstream from SCR device 220 (e.g., such as measured by upstream NOx sensor 242) over a moving time frame; a sufficiently small value indicates a minimal variation in upstream NOx concentration and the SCR can be considered to be in steady state. It should be noted that other techniques may be used to determine if the vehicle is operating in a steady state, such as using engine fuel NOx gradient, or any other measurements. For example, a steady state condition can be comprise a root mean square value of the upstream NOx concentration of less than a predetermined value, such as about 30 ppm, less than about 20 ppm, or less than about 10 ppm. SCR steady state conditions can often correlate with ICE 26 steady state conditions (e.g., generally consistent RPM, fuel injection, temperature, etc.) Intrusive tests can be used to distinguish between reductant signals and NOx signals, which include halting all or most reductant dosing for a period of time. While intrusive tests can be performed under steady state conditions, they can, in some circumstances, yield undesirable exhaust emissions during the test period, such as emissions with an increased NOx concentration.

Figure 3:
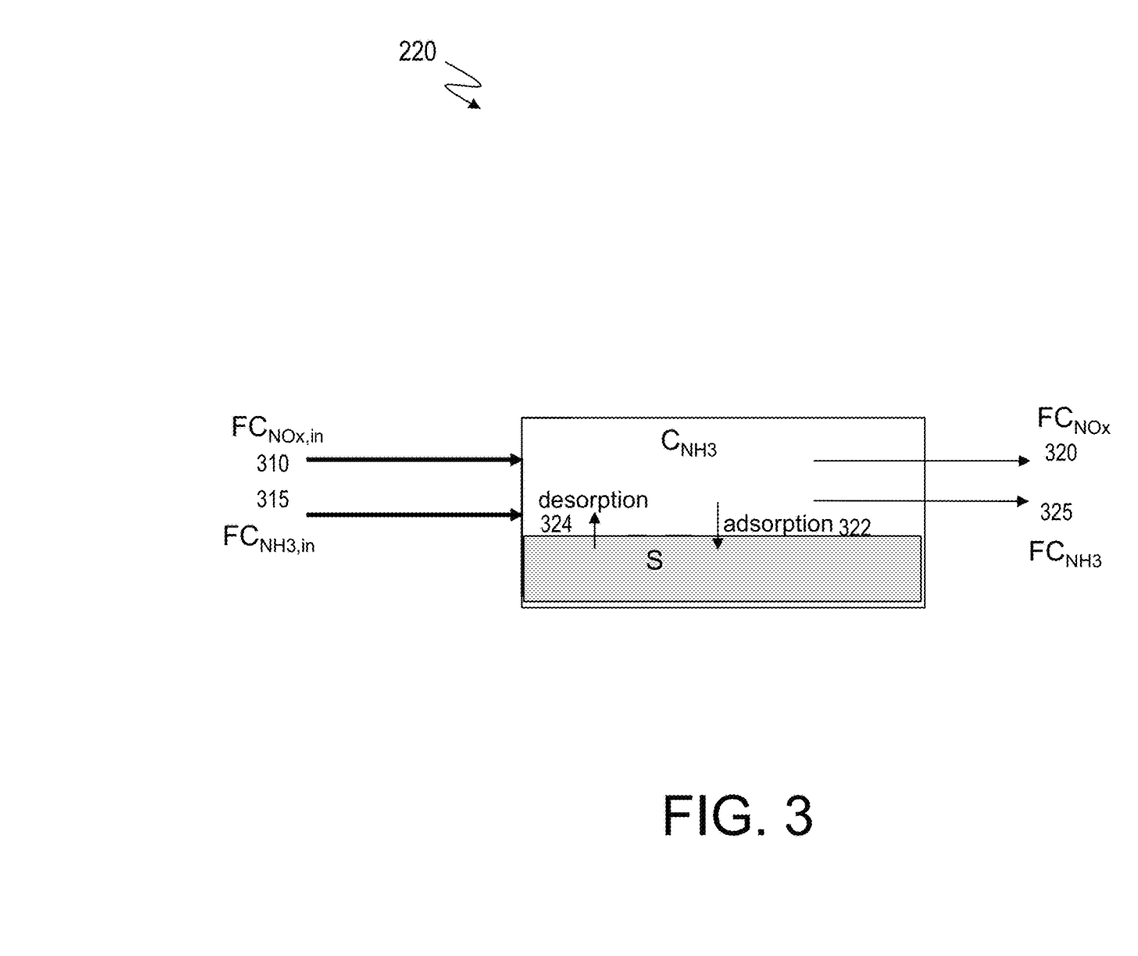
FIG. 3 illustrates an example flow of the gases through an SCR device, according to one or more embodiments.

FIG. 3 illustrates an example flow of the gas exhaust through the SCR device 220, according to one or more embodiments. The control module 238 measures the flow rate (F) of gas volume, and concentration C of the gas. For example, the SCR device 220 determines an input flow-rate of NOx 310 as $FC_{NOx,in}$, where F is the volume of the incoming gas 216, and $C_{NOx,in}$ is the inlet concentration of NOx in the incoming gas 216. Similarly, $FC_{NOx,in}$ is the volume of the flow-rate of $NH_3$ 315 in the incoming gas 216, $C_{NH3,in}$ being the inlet concentration of $NH_3$. Further, compensating for the amount of adsorption 322 and amount of desorption 324, and the amounts reacted on the catalyst surface, the control module 238 may determine $C_{NH3}$ as the SCR concentration of $NH_3$, and $C_{NOx}$ as SCR concentration of NOx.

Accordingly, $F_{CNOx}$ is the $NO_x$ outlet volume flow rate 320 of $NO_x$ through the outlet of the SCR device 220. In one or more examples, the control module 238 may determine $W_{NOx}FC_{NOx}$ as mass flow rate of NOx, where $W_{NOx}$ is the molecular weight of NOx. Similarly, for $NH_3$, the outlet volume flow rate 325 is $FC_{NH3}$ with the mass flow rate of $NH_3$ being $W_{NH3}FC_{NH3}$.

As described earlier, the control module 238 controls the reductant injection rate precisely; such as ammonia producing urea aqueous solution injection rate. An insufficient injection may result in unacceptably low NOx conversions. An injection rate that is too high results in release of ammonia from the SCR device 220. These ammonia emissions from SCR systems are known as ammonia slip.

Accordingly, referring back to FIG. 2, the control module 238 controls operation of the injector 236 based on the chemical model and desired NH3 storage setpoint to determine an amount of reductant 246 to be injected as described herein. The control module 238 may determine a correction coefficient corresponding to the reductant storage based on monitoring the one or more sensors, and may more precisely control the amount of injected reductant provided by the injector 236. For example, the control module 238 determines a reductant injector energizing time correction coefficient to further reduce or eliminate discrepancy between the chemical model and actual SCR outlet NOx emissions. Alternatively, or in addition, the control module 238 determines a $NH_3$ set-point correction to reduce or eliminate discrepancy between the chemical model and actual SCR outlet NOx emissions. Accordingly, the supply of reductant 246 may be utilized more efficiently. For example, the reducing agent injected into the exhaust gas 216 may form $NH_3$ when injected into the exhaust gas 216. Accordingly, the control module 238 controls an amount of $NH_3$ supplied to the SCR device 220. The SCR catalyst adsorbs (i.e., stores) $NH_3$. The amount of $NH_3$ stored by the SCR device 220 may be referred to hereinafter as an "$NH_3$ storage level." The control module 238 may control the amount of $NH_3$ supplied to the SCR device 220 to regulate the $NH_3$ storage level. $NH_3$ stored in the SCR device 220 reacts with NOx in the exhaust gas 216 passing therethrough.

In one or more examples, the percentage of NOx that is removed from the exhaust gas 216 entering the SCR device 220 may be referred to as a conversion efficiency of the SCR device 220. The control module 238 may determine the conversion efficiency of the SCR device 220 based on $NOx_{in}$ and $NOx_{out}$ signals generated by the first (upstream) NOx sensor 242 and second (downstream) NOx sensor 242' respectively. For example, the control module 238 may determine the conversion efficiency of the SCR device 220 based on the following equation:

$$SCR_{eff}=(NOx_{in}-NOx_{out})/NOx_{in} \qquad (7)$$

$NH_3$ slip can also be caused because of an increase in the temperature of the SCR catalyst. For example, $NH_3$ may desorb from the SCR catalyst when the temperature increases at times when the $NH_3$ storage level is near to the maximum $NH_3$ storage level. $NH_3$ slip may also occur due to an error (e.g., storage level estimation error) or faulty component (e.g., faulty injector) in the emissions control system 34.

Typically, the control module 238 estimates an $NH_3$ storage level of the SCR device 220 based on the chemical model. In one or more examples, the $NH_3$ storage set-point ("set-point") is calibrate-able. The control module 238 uses the chemical model to estimate the current storage level of $NH_3$ in the SCR device 220, and the storage level governor provides feedback to the injection controls to determine the injection rate to provide $NH_3$ for reactions according to the chemical model and to maintain a target storage level. The set-point may indicate a target storage level for given operating conditions (e.g., a temperature of the SCR catalyst). Accordingly, the set-point may indicate a storage level (S) and a temperature (T) of the SCR device 220. The set-point may be denoted as (S, T). The control module 238 controls the reductant injector 236 to manage the amount of reducing agent injected into the exhaust gas 216 to adjust the storage level of the SCR device 220 to the set-point. For example, the control module 238 commands the injector 236 to increase or decrease the storage level to reach the set-point when a new set-point is determined. Additionally, the control module 238 commands the reductant injector 236 to increase or decrease the storage level to maintain the set-point when the set-point has been reached.

The technical features described herein facilitate the emissions control system 34 to enter a steady state ammonia slip detection based on a downstream NOx error (e.g. 1.5 Std dev, 37.5 ppm). For example, in the steady state, ammonia slip detection is performed by disabling exhaustive fluid (DEF) injection. However, such techniques may potentially increase NOx emissions during DEF injection dose-off events. Additionally, in certain operating conditions, the SCR device 220 may be unable to adapt enough to eliminate NOx breakthrough or NH3 slip, which may in some conditions, result in cycling in and out of steady state slip detection. Accordingly, in one or more examples, the ammonia slip and/or NOx breakthrough detection is performed by modulating engine out NOx rather than by disabling DEF injection to intrusively detect the presence of $NH_3$ slip or NOx breakthrough in steady state operating conditions, where other $NH_3$ slip detection strategies are typically ineffective. The use of engine out NOx modulation can prevent the tailpipe NOx emissions increase that correspond to DEF injection disablement. Once in the plausibility state, the technical features facilitate the integration of the NOx error using a different, smaller error value (e.g. 0.5 std dev, 12.5 ppm). The technical features thus facilitate the emissions control system 34 to make a "final" adaptation and stop the cycling in and out of steady state slip detection.

In one or more examples, the control module 238 uses the chemical model of the SCR catalyst to predict the NOx concentration in the exhaust gases 216 entering the SCR device 220. Further, based on the predicted NOx concentration, the control module 238 determines an amount of $NH_3$ with which to dose the exhaust gases 216 to satisfy the emissions threshold. The control module 238 typically implements an adaptive semi-closed loop control strategy to maintain SCR performance according to the chemical model, where the control module continuously learns one or more parameters associated with the chemical model according to the ongoing performance of the motor vehicle 10. However, a technical challenge for an exhaust system using an adaptive control strategy is that if there exists a downstream NOx error (downstream NOx sensor vs downstream NOx model) that is high enough to cause a steady state slip detection event, it can cause the exhaust system to cycle in and out of steady state slip detection without an adaption. In one or more examples, the error is large enough to cause the emissions control system 34 to enter into a steady state slip detection, but not large enough to cause an adaptation when the detection process is completed. In some embodiments, the steady state condition may correspond to a condition where ICE speed or load is constant.

Figure 4:
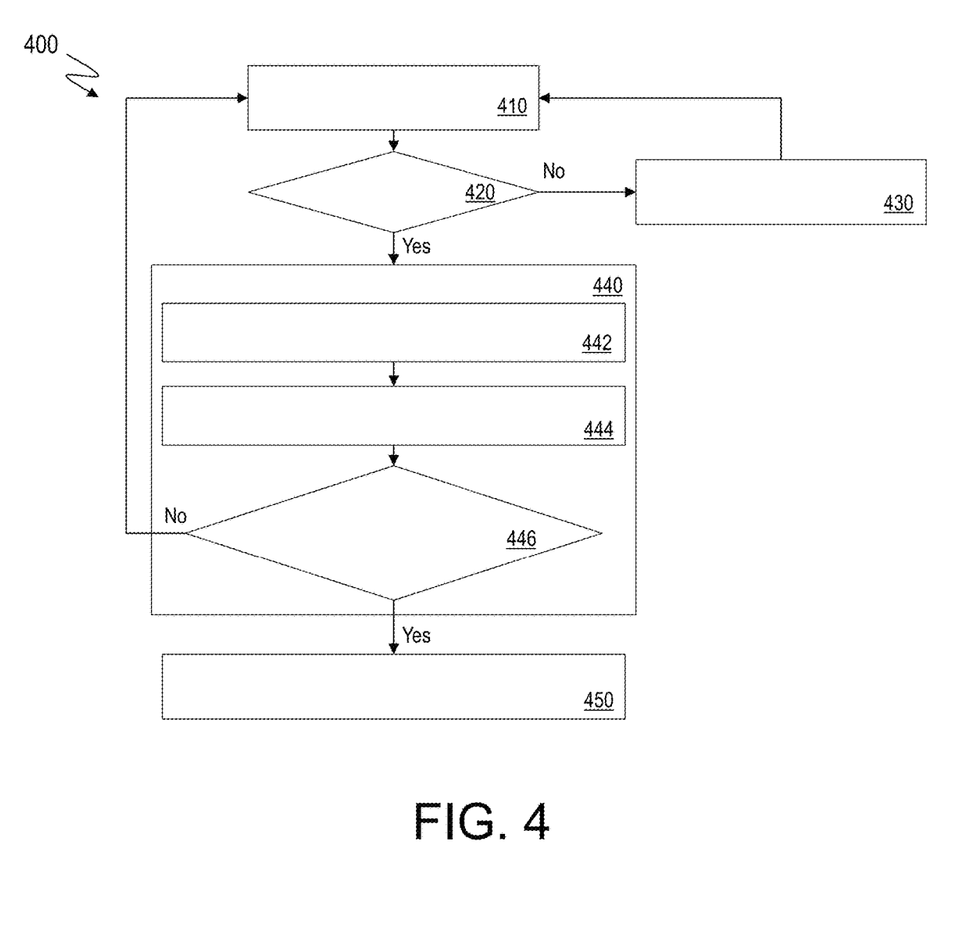
FIG. 4 illustrates a flowchart of an exemplary method for detecting ammonia slip in an SCR device according to one or more embodiments.

FIG. 4 illustrates a flowchart of an exemplary method 400 for detecting ammonia slip in an SCR device according to one or more embodiments. The method 400 is implemented by the controller 38, in one or more examples. Alternatively, the method 400 is implemented by one or more electric circuits. In one or more examples, the method 400 is implemented by execution of logic that may be provided or stored in the form of computer readable and/or executable instructions.

The method 400 includes receiving a measurement of NOx from the downstream NOx sensor 242', as shown at 410. Further, it is checked to see if the ICE 26 is in a preselected engine operating condition, such as a "steady state" operating condition where the NOx produced by the engine is substantially constant, as shown at 420. For example, a steady state operating condition may correspond to a condition where the vehicle 10 is motoring, e.g., engine speed or load is substantially constant. The method continues to detect $NH_3$ slip detection for other operating states of the ICE 26 and loop through such steps until the preselected stead state operating condition is detected, as shown at 430.

If the ICE 26 is determined to be operating in steady state, the method performs a steady state $NH_3$ slip detection for the steady state operation of the ICE 26, as shown at 440. The steady state $NH_3$ slip detection includes computing a predicted downstream NOx value based on the chemical model of the SCR device 220, as shown at 442. The predicted downstream NOx value is determined based on the semi-closed loop calculations described herein, along with one or more sensor values, such as inlet/outlet temperature, inlet/outlet pressure, and earlier NOx measurements, among others. The slip detection further includes comparing the NOx measurement from the sensor with the predicted NOx value and/or determining a difference between the two values, as shown at 444. The difference may be referred to as a NOx measurement error, in one or more examples.

The method further includes comparing the NOx measurement error with a threshold value, as shown at 446. The threshold value is set to a first predetermined value. For example, the NOx measurement and predicted value may indicate a concentration of NOx in the exhaust gases 216. In such a case, in one or more examples, the predetermined value may be a predetermined concentration of NOx, such as 37.5 ppm (or any other value). In one or more examples, the predetermined value may be determined based on a specified statistic such as a standard deviation, for example 1.5 standard deviation. For example, the predetermined value is calibrated to a modeled downstream NOx value. The measured downstream NOx is thus normalized against the expected error of the sensor. The normalized error, 1.5 in this example, is then compared to the threshold for entry into steady state slip detection logic. The predetermined value of the concentration of the NOx that is used as the threshold for comparison, in such cases, is computed based on the earlier values of the NOx measured by the NOx sensor 242'. In other words, in the above example scenario, the 37.5 ppm is used as the threshold value because 37.5 is the 1.5 standard deviation value of earlier NOx measurements. It should be noted that in one or more examples, the NOx measurement and predicted value used may be a NOx flow rate, or any other NOx attribute (instead of the NOx concentration).

If the NOx measurement error is less than (or equal to) the threshold (set to the first predetermined value), the SCR device 220 is deemed to be operating without a $NH_3$ slip, and the operation continues to loop, as shown at 446. If the NOx measurement error is greater than (or equal to) the threshold (set to the first predetermined value), the SCR device 220 is adapted to prevent an $NH_3$ slip event, as shown at 450. For example, the reductant dosing rate is adapted to achieve the desired $NO_x$ concentration or flow rate in exhaust gas 216 downstream of the SCR device 220, or achieve a desired NOx conversion rate.

Typically, the reductant dosing rate is adjusted based on the NOx measurement error. However, as described herein, in one or more examples, in the steady state operating mode of the ICE 26, the NOx measurement error of the same value as that observed to initiate the adaptation may not repeat, resulting in the adaptation being abandoned. This leads to the exhaust system to cycle in and out of steady state slip detection without any adaption. In one or more examples, the NOx error is large enough to cause the emissions control system 34 to enter into the steady state slip adaptation, but not large enough to cause an adaptation when the detection process is completed.

Figure 5:
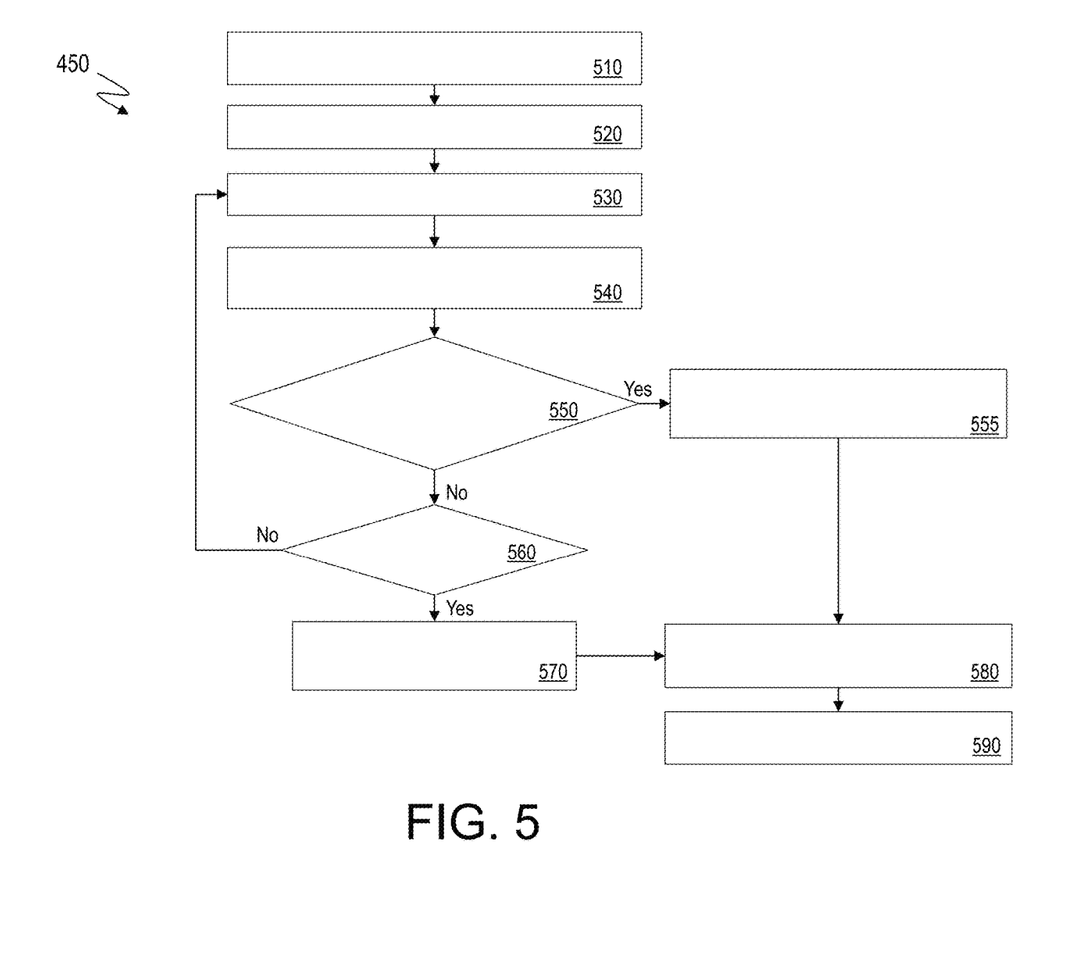
FIG. 5 illustrates a flowchart of an example method for facilitating the SCR device to make an adaptation and preventing steady state NH3 slip detection cycling.

FIG. 5 illustrates a flow chart of an example method 450 for facilitating the SCR device 220 to make an adaptation to the dosing rate and preventing the steady state $NH_3$ slip detection cycling. The method addresses the technical challenge described above. The SCR device 220 implements such a method as part of the method 400 (FIG. 4) for detecting ammonia slip in an SCR device according to one or more embodiments.

As described with reference to FIG. 4, the method 450 is initiated in response to the NOx measurement error being above the threshold that is set to the first predetermined value. The method 450 includes calibrating the threshold to a second predetermined value, as shown at 510. In one or more examples, the second predetermined value is smaller than the first predetermined value used to enter the steady state adaptation. For example, the second predetermined value may be 12.5 ppm concentration value of NOx, compared to the first predetermined value of 37.5 ppm. It should be noted that in other examples the second predetermined value may be different than the above example. Further, in one or more examples, the second predetermined value is determined based on a specified statistic, such as a standard deviation. For example, the second predetermined value may be 0.5 standard deviation (compared to the first predetermined value's 1.5) with reference to the previous NOx measurements.

Further, the method 450 includes initiating a timer for a predetermined duration, such as 1 second, 5 seconds, or any other predetermined duration, as shown at 520. In one or more examples, the predetermined duration is the typical time taken by the SCR device 220 to complete the steady state $NH_3$ slip detection (block 440 of FIG. 4).

Further, the method includes receiving a measurement from the NOx sensor 242' that is downstream from the SCR device 220, as shown at 530. The method further includes determining a difference between the measurement and the predicted value that is based on the chemical model, as shown at 540. It should be noted that the measurement and difference of the method 450 are a second set of measurement and difference, separate from the first measurement and difference that was used to initiate the SCR adaptation in the method 400. The difference between the second measurement and the predicted value may be referred to as the second NOx measurement error.

The method 450 further includes checking if the second NOx measurement error exceeds the threshold value, which is now set to the second predetermined value, as shown at 550. If the second NOx measurement error does exceed the threshold value, that is the second predetermined value, the SCR device 220 adjusts the reductant dosing rate according to the second predetermined value as part of the SCR adaptation, as shown at 555.

The method 450 further includes calibrating the threshold to the first predetermined value, as shown at 580. The SCR device 220 thus continues to operate and detect the NH$_3$ slip detection based on the first (larger) predetermined value, as shown at 590.

If the second NOx measurement error does exceed the threshold value, that is the second predetermined value, the SCR device 220 continues to periodically receive the NOx measurement from the downstream NOx sensor 242' until the timer duration is completed, as shown at 560. If the timer duration completes without the second predetermined value being exceeded by the second NOx measurement error, the SCR device 220 is not adapted, and thus, continues operation without adaptation, as shown at 570. The method 450 further includes calibrating the threshold to the first predetermined value after completion of the timer duration, as shown at 580. The SCR device 220 thus continues to operate and detect the NH$_3$ slip detection based on the first (larger) predetermined value, as shown at 590.

The technical features herein facilitate the exhaust system 34 to use a different, smaller error value (Ex. 0.5 std dev, 12.5 ppm) for adaptation, once the steady state slip detection is triggered and the SCR device 220 is in a plausibility state. In other words, the SCR device 220 is adapted using a second, smaller error value in comparison to the first predetermined threshold used to trigger the steady state slip detection. In one or more examples, the first predetermined threshold for the NOx measurement error is restored once adaptation of the SCR device is completed. The SCR device 220 uses the larger (first) error threshold for re-entry into the steady state slip detection logic. The technical features thus, facilitate stopping the cycling of the exhaust system into and out of the steady state slip detection.

The technical solutions described herein facilitate improvements to emissions control systems used in combustion engines, such as those used in vehicles. For example, the technical solutions determine storage correction and adaptation based on integration of a smaller error than what is used to enter a steady state NH$_3$ slip detection logic, the error indicative of a difference between downstream NOx sensor measurement and downstream NOx model. Such improvements facilitate prevention of cycling of steady state NH$_3$ slip detection when the NOx error is just high enough to cause a steady state NH$_3$ slip detection event, but the error is low enough to cause the system to cycle in and out of the steady state NH$_3$ slip detection without any adapts.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An emissions control system for treating exhaust gas in a motor vehicle including an internal combustion engine, the emissions control system comprising:
    a selective catalytic reduction (SCR) device;
    an NOx sensor; and
    a controller that is configured to perform ammonia slip detection by:
        comparing an NOx measurement from the NOx sensor with a predicted NOx value; and
        in response to the NOx measurement exceeding the predicted NOx value by a threshold value, the threshold value being calibrated to a first predetermined value:
            calibrating the threshold value to a second predetermined value;
            initiating a timer of a predetermined duration; and
            during the predetermined duration of the timer:
                in response to a second NOx measurement from the NOx sensor exceeding the predicted NOx value by the threshold value set to the second predetermined value, adapting a reductant dosing rate of the SCR device according to the second predetermined value;
        wherein the second predetermined value is less than or equal to 50% of the first predetermined value.

2. The emissions control system of claim 1, wherein the controller is further configured to: after completion of the timer, calibrate the threshold value to the first predetermined value.

3. The emissions control system of claim 1, wherein the controller is further configured to: after adapting the reductant dosing rate of the SCR device according to the second predetermined value, calibrate the threshold value to the first predetermined value.

4. The emissions control system of claim 1, wherein the predicted NOx value is based on a chemical model of the SCR device.

5. The emissions control system of claim 1, wherein the NOx sensor is located downstream from the SCR device.

6. The emissions control system of claim 1, wherein the second predetermined value is less than or equal to 40% of the first predetermined value.

7. The emissions control system of claim 1, wherein the controller is further configured to:
    determine that an operating state of the internal combustion engine; and
    initialize the ammonia slip detection in response to the internal combustion engine operating in a steady state.

8. An exhaust system for treating exhaust gas emitted by an internal combustion engine, configured to perform a selective catalytic reduction (SCR) of exhaust gas, the exhaust system comprising:
    a controller configured to perform ammonia slip detection by:
        comparing an NOx measurement from an NOx sensor of the exhaust system with a predicted NOx value; and
        in response to the NOx measurement exceeding the predicted NOx value by a threshold value, the threshold value being calibrated to a first predetermined value:
            calibrating the threshold value to a second predetermined value; and
            initiating a timer of a predetermined duration, wherein during the predetermined duration of the timer:
                in response to a second NOx measurement from the NOx sensor exceeding the predicted NOx value by the threshold value set to the second predetermined value, adapting a reductant dosing rate for the SCR according to the second predetermined value;
        wherein the second predetermined value is less than or equal to 50% of the first predetermined value.

9. The exhaust system of claim 8, wherein the controller is further configured to: after completion of the timer, calibrate the threshold value to the first predetermined value.

10. The exhaust system of claim 8, wherein the controller is further configured to: after adapting the reductant dosing rate of the SCR according to the second predetermined value, calibrate the threshold value to the first predetermined value.

11. The exhaust system of claim 8, wherein the predicted NOx value is based on a chemical model of the SCR.

12. The exhaust system of claim 8, wherein the NOx sensor measures the NOx measurement downstream after the SCR of the exhaust gas.

13. The exhaust system of claim 8, wherein the second predetermined value is less than or equal to 40% of the first predetermined value.

14. The exhaust system of claim 8, wherein the controller is further configured to:
   determine that an operating state of the internal combustion engine; and
   initialize the ammonia slip detection in response to the internal combustion engine operating in a steady state.

15. A computer-implemented method for controlling a selective catalytic reduction (SCR) device of an exhaust system of an internal combustion engine, the method comprising:
   performing ammonia slip detection by:
      comparing an NOx measurement from an NOx sensor of the SCR device with a predicted NOx value; and
      in response to the NOx measurement exceeding the predicted NOx value by a threshold value, the threshold value being calibrated to a first predetermined value:
         calibrating the threshold value to a second predetermined value; and
         initiating a timer of a predetermined duration, wherein during the predetermined duration of the timer:
            in response to a second NOx measurement from the NOx sensor exceeding the predicted NOx value by the threshold value set to the second predetermined value, adapting a reductant dosing rate of the SCR device according to the second predetermined value;
         wherein the second predetermined value is less than or equal to 50% of the first predetermined value.

16. The method of claim 15, further comprising:
   after completion of the timer, calibrating the threshold value to the first predetermined value.

17. The method of claim 15, further comprising:
   after adapting the reductant dosing rate of the SCR device according to the second predetermined value, calibrating the threshold value to the first predetermined value.

18. The method of claim 15, wherein the second predetermined value is less than or equal to 40% of the first predetermined value.

19. The method of claim 15, further comprising:
   determining that an operating state of the internal combustion engine; and
   initializing the ammonia slip detection in response to the internal combustion engine operating in a steady state.

20. The method of claim 15, wherein the NOx sensor is located downstream from the SCR device.

* * * * *